July 13, 1954  V. J. JANDASEK  2,683,509
ONE-WAY ENGAGING MECHANISM
Filed Nov. 22, 1950
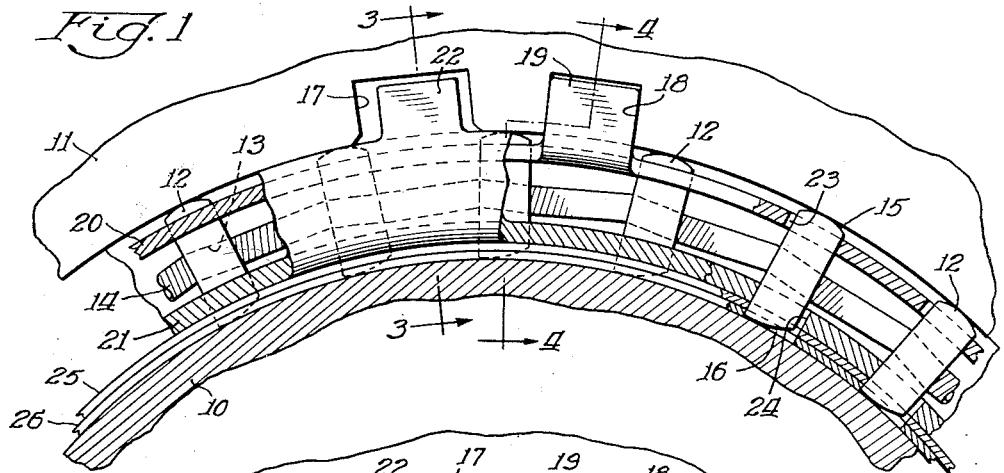
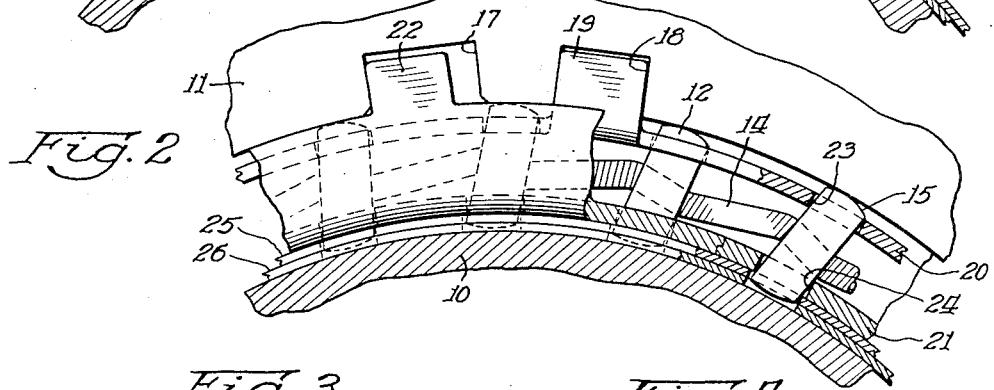
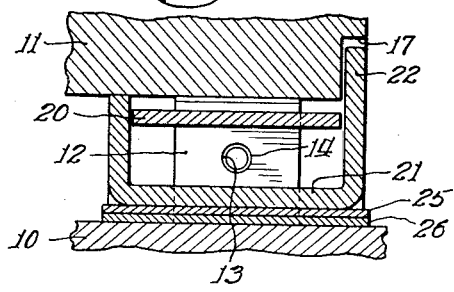
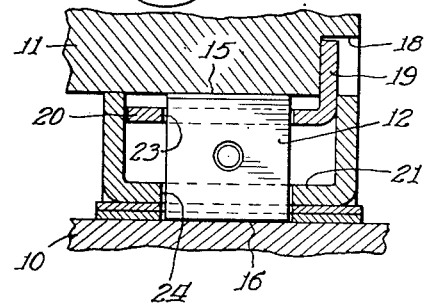
Inventor:
Vladimir J. Jandasek Patented July 13, 1954

2,683,509

UNITED STATES PATENT OFFICE 2,683,509

ONE-WAY ENGAGING MECHANISM

Vladimir J. Jandasek, Detroit, Mich., assignor to Borg-Warner Corporation, Chicago, Ill., a corporation of Illinois Application November 22, 1950, Serial No. 196,991

3 Claims. (Cl. 192—45.1)

1

The present invention relates to one-way engaging devices and more particularly to one-way engaging devices employing sprags that are movable into engagement with both of a pair of concentrically mounted and radially spaced races when one of the races tends to rotate in one direction relative to the other and which become disengaged when the one race tends to move in the opposite direction relative to the other.

The main object of the present invention is to provide a one-way engaging device wherein the engaging means for interconnecting a pair of coaxially mounted members are effective to engage both members when one of them tends to rotate in one direction relative to the other but which become completely disengaged from one of the members and are carried by the other member when there is a tendency for the members to rotate relatively in the opposite direction.

The present invention finds particular utility as an overrunning clutch or brake of the type used in automotive vehicle transmissions. It is well-known to use sprags in this type of clutches and brakes which are disposed between a pair of coaxilly mounted races and which engage both races when one of the races tends to move in one direction relative to the other in order to lock the races together and cause them to rotate in unison. But when the members tend to rotate relatively in the opposite direction, the sprags, although ineffective to lock the races together under this condition, nevertheless frictionally engage both of the members. This frictional engagement causes wear and particularly the the sprags wear out very rapidly when one of the members overruns the other.

The specific object of the present invention is to provide a one-way or overrunning engaging means utilizing sprags for interconnecting a pair of relatively rotatable members wherein means are provided for disengaging the sprags completely from one of the members when it tends to overrun the other to thereby prevent frictional wear of the sprags during such overrunning.

Another object is to provide a one-way engaging device utilizing a plurality of sprags disposed between a pair of relatively rotatable races and which are maintained in peripherally spaced relation between the races by a pair of cages, and in which one of the cages is effective, when one of the races tends to overrun the other, to pivot the sprags and thereby cause them to become disengaged from one of the races to prevent frictional wear of the sprags.

A further object of the invention is to provide

2 a one-way engaging device utilizing a plurality of sprags disposed between a pair of relatively rotatable races, the sprags being maintained peripherally spaced between the races by a pair of cages, and in which one of the cages is caused to move relative to the other cage when one of the races tends to overrun the other races, due to friction between the one cage and one of the races to thereby pivot the sprags and cause them to become disengaged from one of the races and consequently prevent frictional wear of the sprags.

The above and numerous other objects and advantages of the present invention will become apparent from the following detailed description when read in conjunction with the accompanying drawings, wherein:

Fig. 1 is a fragmentary sectional view showing a one-way engaging device constructed in accordance with the principles of the present invention, with both races of the device engaged by the sprags;

Fig. 2 is a fragmentary sectional view, similar to Fig. 1, but showing the engaging device when one of the races tends to overrun the other;

Fig. 3 is a detailed sectional view taken substantially along the line 3—3 of Fig. 1; and Fig. 4 is a detailed sectional view taken substantially along the line 4—4 of Fig. 1.

With reference now to the drawings, wherein like reference numerals identify similar parts in the different views, the one-way engaging device includes an inner race 10 and an outer race 11. Both of the races 10 and 11 are concentrically mounted and are radially spaced substantially a uniform distance apart throughout their peripheries. A plurality of sprags or grippers 12 are disposed in the space between the races 10 and 11 and each has an aperture 13 therethrough. The apertures 13 are so directed that a garter spring 14 extending therethrough constantly biases each of the sprags in a counterclockwise direction about their own axes. Each of the sprags 12 has a cylindrical outer surface 15 which is designed to engage the outer race 11 and a cam shaped surface 16 which engages the inner race 10. The garter spring 14 is under tension and due to the slope of the apertures 13 through the sprags 15 the spring urges the sprags pivotally so that the cylindrical surface 15 engages the outer race 11 and the cam surface 16 engages the inner race 10.

The outer race 11 is provided with a pair of slots 17 and 18. A tang 19, formed integrally with an outer cage 20, is mounted within the slot 18.

The tang 19 fits snugly within the slot 18. An inner cage 21 has a tang 22 that is positioned within the slot 17. The slot 17 is somewhat longer than the width of the tang 22 and therefore the inner cage 21 may move a slight amount angularly with respect to the outer race 11. The outer cage 20 is provided with a plurality of apertures 23 and the inner cage 21 is provided with a plurality of apertures 24. The apertures 23 and 24 are slightly larger than the sprags 12 which are positioned within the apertures in order to maintain the sprags peripherally spaced between the races 10 and 11. Mounted concentrically within the inner cage 21 is a bushing 25 and between the bushing 25 and the inner race 10 is a friction facing 26 secured to the bushing 25 and frictionally engaging the inner race 10. The bushing 25 frictionally engages the inner cage 21.

With reference to Fig. 1 the operation of the one-way engaging device when the outer race 11 rotates counterclockwise and tends to overrun or drive the inner race 10 will be described. Under this condition the bushing 25, friction facing 26 and inner cage 21 tend to rotate with the inner race 10 and this causes the slots 23 and 24 to align themselves such that the garter spring may bias the sprags 12 counterclockwise about their own axes to thereby cause the sprags to engage both races 10 and 11. It is therefore apparent that the outer race, when it tends to rotate counterclockwise relative to the inner race, becomes locked with the inner race 10 so that both races rotate in unison in a counterclockwise direction. If the inner race tends to rotate clockwise relative to the outer race, it is apparent that the sprags 12 will be pivoted counterclockwise about their axes in the same manner to thereby lock the inner race 10 to the outer race 11 such that the inner race will drive the outer race in unison and in a clockwise direction.

The operation of the one-way engaging device when one of the races 10 or 11 tends to overrun the other will now be described. Assuming first that the inner race tends to rotate counterclockwise relative to the outer race 11, which condition is shown in Fig. 2, the friction facing 26, bushing 25 and inner cage 21 are rotated with the inner race whereby the tang 22 moves slightly angularly in the slot 17 to the position shown in Fig. 2. Under this condition the inner cage moves counterclockwise slightly with respect to the outer cage and accordingly the sprags 12 are pivoted to the positions thereof shown in Fig. 2. Due to the counterclockwise pivotal movement of the sprags the cam surfaces 16 are disengaged from the inner race and also because of centrifugal force the sprags are moved outwardly and thereby become completely disengaged from the inner race 10. Thus there is no frictional engagement between the sprags and the inner race 10 during overrunning of the inner race in a counterclockwise direction with respect to the outer race. If the outer race 11 tends to rotate clockwise relative to the inner race the sprags 12 will be pivoted clockwise as shown in Fig. 2 whereby they become disengaged from the inner race 10 and consequently permit the outer race to freely overrun the inner race.

It will be noted that during the overrunning condition of the engaging device disclosed herein, the grippers or sprags 12 rotate with the outer race 11, with the friction facing 26 on the bushing 25 sliding over the inner race 10. The friction facing takes the wear and the bushing 25 provides the desired peripheral strength. It will be noted that there is only slight relative movement between the bushing 25 and the inner cage 21 at any time and consequently there will be little, if any, wear between these parts.

It is thus apparent that the present invention provides a one-way engaging or overrunning device which prevents frictional engagement of the sprags with one of the races when one of the races tends to overrun the other. Consequently the greatest source of wear to the sprags has been eliminated.

It is apparent that the present invention is equally applicable to either a brake or a clutch of the overrunning type. When the present device is being used as a one-way clutch both of the races 10 and 11 are rotatable. If it is desired to use the invention as a one-way brake it is only necessary that one of the races 10 or 11 be stationarily mounted.

It is contemplated that numerous changes and modifications will be made in the present invention without departing from the spirit or scope thereof.

I claim:

1. In a one-way engaging device, driving and driven members, said members respectively including means defining opposed coaxial spaced races, a plurality of tiltable grippers disposed between said races and each being capable of tilting into and out of wedging engagement with said races, a first cylindrically shaped cage concentrically disposed between said races and being closer to the race on one of said members than to the race on the other member and having a tang snugly fitting within a slot in said one member to provide a positive connection between the first cage and said one member, said first cage having a plurality of peripherally spaced gripper receiving openings therein for receiving and peripherally spacing said grippers between said races, means cooperating with each of said grippers and effective upon relative rotation of said one member in one direction with respect to the other for tilting said grippers into wedging engagement with said races to connect said members together for rotation in unison, a second cylindrically shaped cage concentrically disposed between said races and being closer to the race on said other member than to the race on said one member and having a tang loosely fitting within a second slot in said one member to provide a lost motion connection between the second cage and said one member, said second cage having a plurality of peripherally spaced gripper receiving openings therein, said grippers being received in the openings in each of said cages, said lost motion connection between said second cage and said one member permitting sufficient peripheral displacement of said second cage to allow said grippers to wedgingly engage both of said races or to be completely disengaged from the race on the other of said members, and means providing a frictional connection between said second cage and the race on said other of said members so that upon relative rotation of said one member with respect to said other in the opposite direction the frictional connection effects the peripheral displacement of said second cage permitted by said lost motion connection to thereby tilt the grippers out of engagement with the race on said other member.

2. In a one-way engaging device, driving and driven members, said members respectively including means defining opposed coaxial spaced races, a plurality of tiltable grippers disposed between said races and each being capable of tilting into and out of wedging engagement with said races, a first cylindrical cage concentrically disposed between said races and being closer to the race on one of said members than to the race on the other member and having a tang snugly fitting within a slot in said one member to provide a positive connection between the first cage and said one member, said first cage having a plurality of peripherally spaced gripper receiving openings therein for receiving and peripherally spacing said grippers between said races, means cooperating with each of said grippers and effective upon relative rotation of said one member in one direction with respect to the other for tilting said grippers into wedging engagement with said races to connect said members together for rotation in unison, a second cylindrical cage concentrically disposed between said races and being closer to the race on said other member than to the race on said one member and having a tang loosely fitting within a second slot in said one member to provide a lost motion connection between the second cage and said one member, said second cage having a plurality of peripherally spaced gripper receiving openings therein, said grippers being received within the openings in each of said cages, said lost motion connection between said second cage and said one member affording sufficient peripheral displacement of said second cage to allow said grippers to wedgingly engage both of said races or to be completely disengaged from the race on the other of said members, and an annular device comprising a bushing disposed in contact with said second cage and having a friction facing engaging the race on said other member for providing a frictional connection between said second cage and the race on said other of said members so that upon relative rotation of said one member with respect to said other in the opposite direction the frictional connection effects the peripheral displacement of said second cage permitted by said lost motion connection to thereby tilt the grippers out of engagement with the race on said other member.

3. In a one-way engaging device, inner and outer concentric races, a plurality of tiltable grippers disposed between said races and each being capable of tilting into and out of wedging engagement with said races, a first cage for peripherally spacing the grippers disposed between said races and closer to the outer race than to the inner race and being positively connected to the outer race, said first cage including means defining gripper received openings for permitting tilting of the grippers, means acting upon each of the grippers for tilting them into wedging engagement with the races when the outer race tends to rotate in one direction with respect to the inner race, a second cage having gripper receiving openings and disposed between said races and closer to the inner race than to the outer race, said grippers being received within the openings in each of said cages, means providing a frictional connection between said second cage and said inner race, and said second cage and said outer race respectively including means defining a lost motion connection therebetween, whereby due to the frictional connection between said second cage and said inner race the second cage is effective when the outer race tends to rotate in the opposite direction relative to the inner race to pivot the grippers in the openings in said first cage out of engagement with said inner race.

References Cited in the file of this patent

UNITED STATES PATENTS

| Number | Name | Date |
|---|---|---|
| 2,366,843 | Dodge et al. | Jan. 9, 1945 |
| 2,404,221 | Dodge | July 16, 1946 |
| 2,486,603 | King | Nov. 1, 1949 |